United States Patent [19]
Conway

[11] 3,788,483
[45] Jan. 29, 1974

[54] APPARATUS FOR FILTRATION

[76] Inventor: Walter D. Conway, 52 MacArthurville Drive, Williamsville, N.Y. 14221

[22] Filed: May 26, 1972

[21] Appl. No.: 257,248

[52] U.S. Cl............... 210/416, 210/436, 210/469, 210/472, 210/474
[51] Int. Cl............................................ B01d 29/00
[58] Field of Search... 210/474, 464, 472, 120, 436, 210/469, 335, 339, 361, 205, 209, 244, 416; 128/272, 218 S; 233/26

[56] References Cited
UNITED STATES PATENTS

| | | | |
|---|---|---|---|
| 2,775,350 | 12/1956 | Jones | 210/477 X |
| 3,300,051 | 1/1967 | Mitchell | 210/472 X |
| 2,389,185 | 11/1945 | Dick | 210/472 |
| 3,508,653 | 4/1970 | Coleman | 210/DIG. 23 |
| 3,583,627 | 6/1971 | Wilson | 210/361 |
| 2,334,802 | 11/1943 | Zuckerman | 210/335 |
| 3,005,455 | 8/1961 | Poltras et al. | 128/272 |

Primary Examiner—Samih N. Zaharna
Assistant Examiner—F. F. Calvetti
Attorney, Agent, or Firm—Christel & Bean

[57] ABSTRACT

The invention describes a device especially suited for laboratory scale filtration comprising a sample container, a filter element attached to the sample container by means of a threaded cap terminating in a funnel-shaped means which conveys the filtrate to a receiving vessel. Various embodiments of the invention allow the filtration to be accomplished either by centrifugal means, application of pressure to the atmosphere in the sample vessel, evacuation of the atmosphere within the receiving vessel, or by gravity flow. The entire assembly may be placed within a tubular-shaped heater to maintain an elevated temperature throughout the course of filtration.

6 Claims, 9 Drawing Figures

PATENTED JAN 29 1974 3,788,483
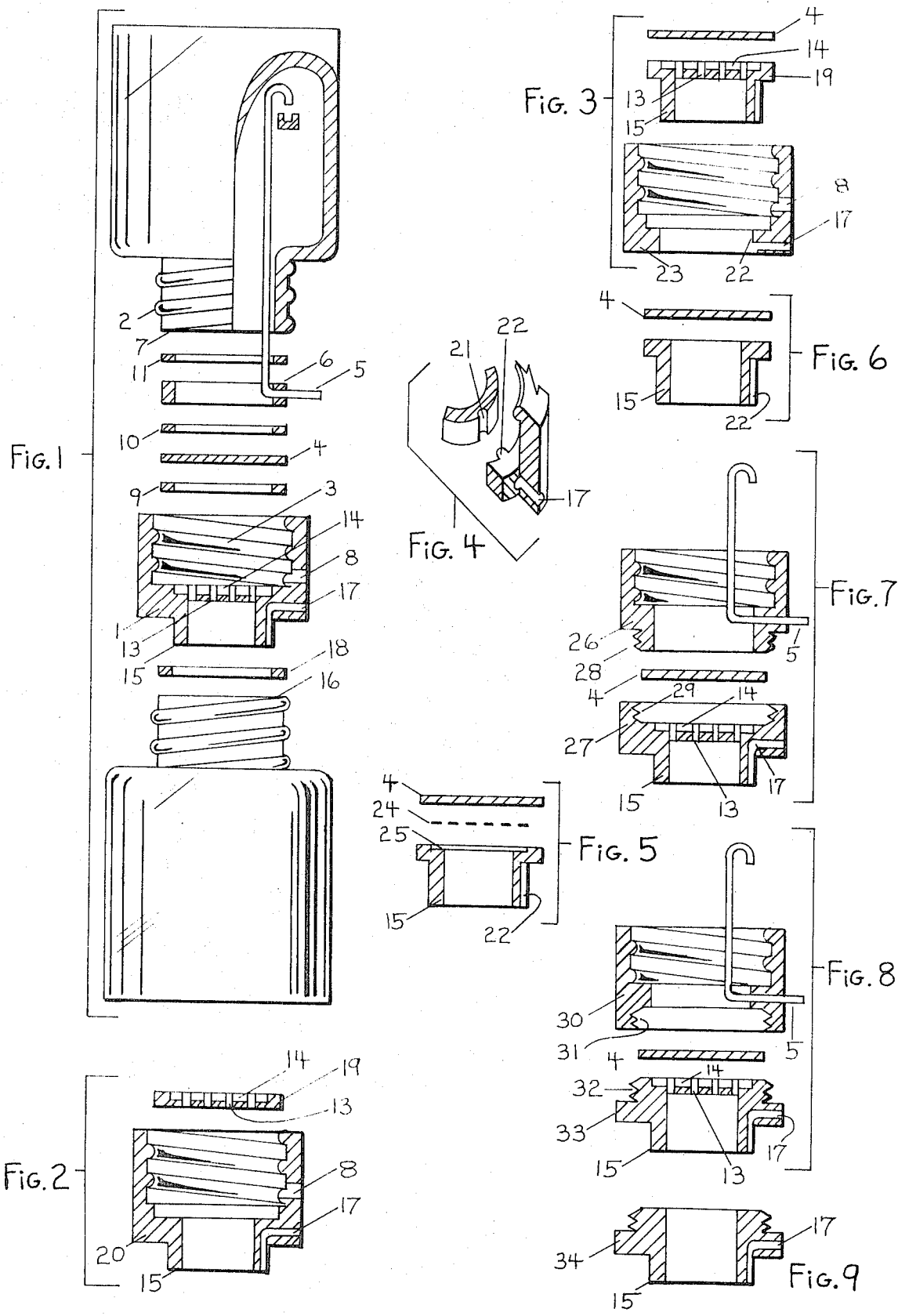

APPARATUS FOR FILTRATION

BACKGROUND OF THE INVENTION

The subject of this invention relates to the art of filtration, the objective of which may be the clarification of a liquid or the recovery of a solid phase from a mixture of solid and liquid.

While many devices have been described to attain these objectives, the present invention permits a simplification of the technique of filtration, particularly when conducted on a small scale in the chemical laboratory.

In general, filtration may be accomplished by application of a driving force to a mixture of a liquid and suspended solids contained in a device which permits passage of the liquid through a porous member while preventing passage of the solids. The driving force may be simply the action of gravity upon the liquid or the driving force may be increased by centrifugally rotating the filtration device. Alternatively a vacuum may be applied to the effluent side of the device or pressure may be applied by either pneumatic or hydraulic means to the influent liquid to cause it to flow through the porous member. In particular situations it may be advantageous to utilize one of these means in preference to the others. For example, when filtering a liquid solution heated to a temperature near its boiling point, it is not convenient to utilize vacuum on the effluent side of the filter, because the lowering of pressure results in rapid evaporation of the filtrate and premature deposition of crystals of the dissolved solid which may clog the pores of the filter thereby preventing further filtration. This difficulty may be avoided by pressurizing the influent liquid or by utilizing centrifugal means to force the liquid through the filter.

SUMMARY OF THE INVENTION

It is an object of the present invention to provide a simple, efficient and inexpensive apparatus which in combination with containers for holding the suspension and the effluent will permit filtration to be accomplished using any of the aforementioned means to effect passage of the liquid through the porous member. The invention includes a threaded cap which supports a porous member and holds it against the opening of a sample container in which is held the suspension to be filtered. In use, the liquid portion of the suspension is forced through the porous member and is conveyed by a funnel-shaped means to a receiving vessel. The liquid flow may be effected by centrifugal force in which case the filtration apparatus is supported upon the receiving vessel and the entire assembly is inserted in a suitable cup and rotated in a centrifuge.

The invention includes a tubular means which passes radially through the side of the cap and extends axially within the sample vessel to a point higher than the liquid contained therein when the vessel is oriented with the cap in a downward position. This tubular means serves several purposes. When the liquid flow is effected by either centrifugal force or evacuation of the receiving vessel, the tube serves as a vent to the atmosphere thereby facilitating filtration by preventing the formation of a vacuum within the sample vessel. The tubular means may also be connected to a source of pressurized gas such as air in order to effect filtration. In the case of easily oxidized substances, the gas may be a chemically inert gas such as nitrogen and in such an instance the gas can be slowly passed through the vent tube prior to filtration when the sample vessel is still in an upright position with the axial portion of the tube beneath the liquid surface thereby providing an inert atmosphere. After filtration has been effected, the tube may be used to introduce portions of liquid to wash the solid residue without the necessity of removing the cap from the sample vessel.

The funnel-shaped means which conveys the filtrate to the receiving vessel also contains a channel through which the atmosphere in the receiving vessel may be evacuated thus permitting filtration by vacuum means.

The process of filtration effected by pneumatic pressure is particularly advantageous when a hot solution saturated with a soluble solid is to be filtered. It is also possible to surround the entire filtration assembly with an electrically heated cylinder so as to maintain the assembly at an elevated temperature during the course of filtration. In all cases the assembly may be disassembled for cleaning. The device allows the use of paper discs as the porous member which may be economically discarded after use. Porous filter members of other materials such as plastic, glass or metal may also be used.

The means for practicing this invention may be constructed in several ways. In some embodiments of the invention the device may be constructed as a single unit while in others it may be comprised of several subassemblies as illustrated in the drawing.

BRIEF DESCRIPTION OF THE DRAWING

FIG. 1 is a collective, side elevational view, partly in section, of one embodiment of the invention in which filtration may be effected by centrifugal, pneumatic or vacuum means.

FIG. 2 is a collective, side elevational view, in section, of part of a filter assembly in which the filter supporting element is removable.

FIG. 3 is a collective, side elevational view, in section, of part of a filter assembly in which a subunit comprising the filter-supporting element and the funnel-shaped means are removable.

FIG. 4 is a collective, fragmentary perspective view, partly in section, illustrating in more detail one of the features shown in FIG. 3.

FIG. 5 is a collective, side elevational view, in section, of a porous filter member, a filter support member and a funnel element which in combination with the threaded means illustrated in FIG. 3 comprise part of a filter assembly.

FIG. 6 is a collective, side elevational view, in section, of a rigid, self-supporting filter element and a funnel element which in combination with the threaded means illustrated in FIG. 3 comprise part of a filter assembly.

FIG. 7 is a collective, side elevational view, in section, of part of a filter assembly containing a tubular means as an integral part of the threaded cap and in which the filter element is secured to the cap by another threaded member.

FIG. 8 is a collective, side elevational view, in section, of part of a filter assembly similar to FIG. 7 but in which the threaded means for securing the filter element to the cap are fashioned in a different manner.

FIG. 9 is a side elevational view, in section, of a funnel-shaped means which may be used in combination with a rigid, self-supporting filter element in the cap assembly of FIG. 8, thereby forming part of a filter assembly.

DESCRIPTION OF THE PREFERRED EMBODIMENTS

The central element of this invention consists of the cap 1 which is adapted to be attached to the threaded neck of the sample vessel 2 by means of threads 3 on its interior surface. The cap secures the porous filter element 4 and an annular ring 6 combined with a tube 5 against the opening 7 of the sample vessel. A hole 8 allows the radially extended portion of the tube 5 to pass through the wall of the cap. Washers 9, 10, 11 of resilient material may be interposed between the various elements to insure a hermetic seal. The end of the axially extended part of the tube 5 may be closed when desired by the cover 12. That portion of the cap oriented transversely to the cylindrical axis contains a plurality of perforations 13 and is provided on its inner surface with a plurality of depressions forming channels 14 in communication with the perforations 13 and defining ridges therebetween. An annular rim 15 projects outwardly from the transverse portion of the cap and fits within the neck of the receiving vessel 16. A passage 17 in the cap serves to vent the receiving vessel to the atmosphere. A washer 18 of resilient material may be used to insure a hermetic seal between the cap 1 and the receiving vessel 16.

While this invention is not limited to any particular structural material, the filtration cap 1 is conveniently made of a plastic which can be formed by injection molding techniques such as polyethylene, polypropylene or certain fluoropolymers, the particular type being chosen with consideration of the chemical solvents with which the device will be used.

It is anticipated that various types of paper will be often used as the filter element 4 in which case an adequate seal will be obtained without the use of washers 9, 10. However, if 4 is made of rigid material, thin washers of resilient plastic may be utilized to obtain a hermetic seal. Likewise if the annular ring 6 is made of a resilient plastic, the washer 11 will not be needed. The sample and receiving vessels are conveniently made of heat resistant glass such as borosilicate glass.

The embodiment of this invention illustrated in FIG. 1 is adapted for filtration by centrifugal means or by application of pneumatic pressure to the sample vessel 2 or by application of vacuum to the receiving vessel 16.

To use the invention for recrystallization of a solid, the material to be purified is dissolved in a small quantity of hot solvent in the sample vessel 2. The hot solution is then cooled and allowed to crystallize. The filtration assembly comprising the cap 1, filter element 4, the annular ring 6 and tube 5 closed with cover 12 and washers 9, 10 and 11 is attached to the sample vessel 2. The cover 12 prevents entrance of solvent into the tube 5. The assembly is inverted on the receiving vessel 16 which receives the annular rim 15 in its neck 16. The washer 18 need be included only if filtration is to be effected by vacuum.

Fan centrifugal filtration the assembly is inserted in a suitable centrifuge cup and rotated for a time sufficient to transfer the liquid to the receiving vessel 16. As the centrifugation commences, the centrifugal force will remove the cover 12 from the tube 5. In this mode of filtration tube 5 serves as a vent and facilitates filtration by preventing the formation of a vacuum in the sample vessel 2. For use in centrifugal filtration it is desirable that the axial terminus of tube 5 be oriented downward as shown in FIG. 1 so that centrifugal force will remove the cover 12.

For pressure filtration, a source of pneumatic pressure is attached to the radially extended portion of tube 5. For small-scale laboratory filtration, a hand-operated rubber bulb attached by a short length of flexible tubing to tube 5 will produce adequate pressure. The first surge of pressure will release the cover 12 on the axially extended end of tube 5.

In both the centrifugal and pneumatic modes of filtration, the vent 17 facilitates the filtration by preventing the buildup of pressure in the receiving vessel 16.

For vacuum filtration, the washer 18 must be included to insure a hermetic seal. A source of vacuum is then attached to the vent passage 17 to evacuate the receiving vessel 16 and thereby effect filtration.

Regardless of the means used to effect filtration, wash solvent may subsequently be admitted to the sample vessel through the tube 5 and then removed by filtration.

The crystals may be dried and examined or subjected to repeated recrystallizations without ever removing them from the sample container 2. The filtrate may be evaporated directly in container 16 for recovery of dissolved solids without loss. The device is obviously ideally suited to facilitate the intricate procedure of fractional crystallization.

The cap 1 shown in FIG. 1 is constructed as a single unit but units constructed of various subassemblies are also within the scope of this invention.

In the cap assembly shown in FIG. 2, the filter supporting assembly 19 is removable from the outer member 20 of the cap assembly which still retains all the features associated with the cap 1 described in FIG. 1.

FIG. 3 illustrates a cap assembly in which the annular rim 15 and the member 19 for supporting the filter member 4 are removable as a unit from the outer member 23 of the cap assembly. The vent passage 17 in the outer member 23 communicates with the channel 21 in the annular rim to form a vent passage analogous to the passage 17 in FIG. 1. The passage 17 and the channel 21 are maintained in alignment by the protuberance 22 which mates with the channel 21 and prevents the annular rim 15 from rotating. The relationship between the protuberance 22 and the channel 21 is more clearly illustrated in the fragmentary perspective view illustrated in FIG. 4.

FIG. 5 illustrates an annular rim 15 adapted by the annular depression 25 to contain a support 24 for the filter member 4, the support being made of metal or plastic cloth or of thin perforated metal or plastic. The particular design shown in FIG. 5 is intended to mate with the outer member 23 of the cap assembly illustrated in FIG. 3.

FIG. 6 illustrates an annular rim 15 adapted to be used with a rigid filter member 4 and combined with the outer member 23 illustrated in FIG. 3.

FIG. 7 illustrates an embodiment of the invention in which the vent tube 5 is made an integral part of the closure member 26. The filter member 4 is held against the opening of the closure member 26 by a device 27 containing filter-supporting means and an extended annular rim 15 and threads 29 which engage threads 28 on the closure member 26. The complete assembly illustrated in FIG. 7 thus contains all the essential features associated with the corresponding assembly previously illustrated in FIG. 1.

FIG. 8 illustrates an embodiment of the invention analogous to FIG. 7 in all essential respects except for the inner and outer relationship of the threads 31 and 32 on the closure member 30 and the means 33 for holding the filter member 4.

FIG. 9 illustrates a means 34 adapted for holding a rigid filter against the closure member 30 illustrated in FIG. 8.

Obviously the features of the invention disclosed herein may be embodied in other combinations of subassemblies to give essentially the same device and all such combinations are considered to be within the scope of this invention.

I claim:

1. A filtration device comprising: a closure member adapted to be attached to the open end of a sample vessel; said closure member having an end wall and a cylindrical wall; said cylindrical wall having internal threads for attachment to said sample vessel; said closure member end wall having a plurality of perforations therethrough defining outlet passages; said end wall having an inner surface provided with a plurality of depressions therein forming channels in communication with said perforations and defining ridges therebetween; a removable filter element mounted in said closure member and supported on said ridges of said inner surface thereof; an annular rim projecting outwardly from the outer surface of said closure member end wall and adapted to be received in a collecting vessel; passage means formed in said closure member end wall and said rim for venting said collecting vessel to atmosphere; a tube extending through said closure member cylindrical wall and having an inner end communicating with the interior of said sample vessel adjacent the closed end thereof and an outer and exteriorly of said closure member selectively attachable to a source of fluid pressure; and means hermetically sealing said closure member to said sample vessel and said collecting vessel.

2. A filtration device according to claim 1 wherein said sealing means comprise a pair of resiliently yieldable washers interposed between said closure member end wall and said sample vessel and said collecting vessel, respectively 3. A filtration device according to claim 1 including a cover closing said inner end of said tube and removable by forces generated during a filtering operation.

4. A filtration device according to claim 1 wherein said end wall includes a central separable portion seating on an annular shoulder formed in said end wall and displaceable therefrom.

5. A filtration device according to claim 4 wherein said rim is formed integral with said end wall separable portion for displacement therewith.

6. A filtration device according to the claim 5 wherein said passage means includes a radial passage formed in said closure member end wall and a channel formed in said rim and extending lengthwise thereof; and means maintaining said radial passage and said channel in communication with each other.

* * * * *

UNITED STATES PATENT OFFICE
CERTIFICATE OF CORRECTION

Patent No. 3,788,483  Dated January 29, 1974

Inventor(s) Walter D. Conway

It is certified that error appears in the above-identified patent and that said Letters Patent are hereby corrected as shown below:

In claim 1, column 6, line 7 "and" (second occurrence) should be --end--

Signed and sealed this 11th day of June 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,788,483    Dated January 29, 1974

Inventor(s) Walter D. Conway

It is certified that error appears in the above-identified patent and that said Letters Patent are hereby corrected as shown below:

On the first page, first column, in inventor's address "MacArthurville" should be --MacArthur--

First page, second column, line 2, "Poltras" should be --Poitras"

Column 3, line 64, "Fan" should be changed to --For--

Signed and sealed this 17th day of September 1974.

(SEAL)
Attest:

McCOY M. GIBSON JR.
Attesting Officer

C. MARSHALL DANN
Commissioner of Patents